United States Patent
Amirsolaimani et al.

(10) Patent No.: US 11,044,460 B1
(45) Date of Patent: Jun. 22, 2021

(54) POLYCHROMATIC OBJECT IMAGER

(71) Applicant: Facebook Technologies, LLC, Menlo Park, CA (US)

(72) Inventors: Babak Amirsolaimani, Redmond, WA (US); Mohamed Tarek El-Haddad, Redmond, WA (US)

(73) Assignee: FACEBOOK TECHNOLOGIES, LLC, Menlo Park, CA (US)

( * ) Notice: Subject to any disclaimer, the term of this patent is extended or adjusted under 35 U.S.C. 154(b) by 131 days.

(21) Appl. No.: 16/401,062

(22) Filed: May 1, 2019

(51) Int. Cl.
*H04N 13/25* (2018.01)
*H04N 13/254* (2018.01)
*G02B 5/32* (2006.01)
*G02B 27/00* (2006.01)
*H04N 13/296* (2018.01)
*G06T 7/55* (2017.01)
*H04N 5/33* (2006.01)

(52) U.S. Cl.
CPC ............ *H04N 13/254* (2018.05); *G02B 5/32* (2013.01); *G02B 27/0093* (2013.01); *G06T 7/55* (2017.01); *H04N 5/33* (2013.01); *H04N 13/25* (2018.05); *H04N 13/296* (2018.05); *G06T 2207/10028* (2013.01); *G06T 2207/10048* (2013.01); *G06T 2207/30201* (2013.01)

(58) Field of Classification Search
None
See application file for complete search history.

(56) References Cited

U.S. PATENT DOCUMENTS

| | | | | |
|---|---|---|---|---|
| 10,149,958 B1* | 12/2018 | Tran | ........................ | G16H 20/30 |
| 10,685,488 B1* | 6/2020 | Kumar | ..................... | G06F 3/011 |
| 2012/0274745 A1* | 11/2012 | Russell | .................... | G06F 3/013 |
| | | | | 348/46 |
| 2019/0166359 A1* | 5/2019 | Lapstun | ............... | H04N 13/232 |

OTHER PUBLICATIONS

"Rainbow three-dimensional camera: new concept of high-speed three-dimensional visions systems" Z. Jason Geng 1996 Society of Photo-Optical Instrumentation Engineers Opt. Eng. 35(2) 376-383 (Feb. 1996).
"High-speed real-time 3D shape measurement based on adaptive depth constraint" Tao et al. Optics Express 22440 vol. 26, No. 17, Aug. 20, 2018.
"Structured-light 3D surface imaging: a tutorial" Jason Geng Advances in Optics and Photonics 3, 128-160 (2011) published Mar. 31, 2011.

* cited by examiner

*Primary Examiner* — Fayyaz Alam
(74) *Attorney, Agent, or Firm* — Pequignot + Myers; Matthew A. Pequignot

(57) ABSTRACT

A three-dimensional object imager uses infrared light at different wavelengths to triangulate depth information of the object from wavelength-dependent detection of the infrared image of the object. The depth information is obtained by determining wavelength of infrared light impinging on different pixels of the array. The wavelength may be determined by breaking each pixel into a plurality of sub-pixels, each sub-pixel having its own spectral selectivity to light at different infrared wavelength. For eye imaging or eye tracking applications, this enables the preservation of an unobstructed field of view of the eye while obtaining real-time, dynamic information about eye position and orientation in an non-intrusive, inconspicuous manner.

19 Claims, 11 Drawing Sheets

POLYCHROMATIC OBJECT IMAGER

TECHNICAL FIELD

The present disclosure relates to imaging devices, and in particular to optical, optoelectronic, and electro-optical devices for 3D imaging, eye imaging and tracking, their components, modules, and related methods of manufacture and operation.

BACKGROUND

Head-mounted displays (HMDs), near-eye displays (NEDs), and other display systems can be used to present virtual scenery to a user, or to augment real scenery with dynamic information, data, or virtual objects. The virtual reality (VR) or augmented reality (AR) scenery can be three-dimensional (3D) to enhance the experience and to match virtual objects to real objects observed by the user. Eye position and gaze direction, and/or orientation of the user may be tracked in real time, and the displayed imagery may be dynamically adjusted depending on the user's head orientation and gaze direction, to provide a better experience of immersion into a simulated or augmented environment. The eye region may be tracked by illuminating the eye, obtaining real-time images of the illuminated eye, and analyzing the obtained images to determine eye position and orientation with the purpose of determination the gaze direction and vergence, i.e. convergence angle of the eyes of a user.

Compact display devices are desired for a near-eye display, e.g. a head-mounted display. Because a display of HMD or NED is usually worn on the head of a user, a large, bulky, unbalanced, and/or heavy head-mounted display device would be cumbersome and uncomfortable for the user to wear.

It is desirable to increase fidelity and reliability of 3D imaging, in particular in its application to eye tracking, while reducing size and weight of an eye tracker device, as well as overall optics block of a near-eye display.

SUMMARY

In accordance with the present disclosure, there is provided a three-dimensional (3D) object imager comprising an infrared light source for illuminating an object with a fan of light beams. The light beams are at different wavelengths within an infrared wavelength range. The 3D object imager further includes an array of detector pixels including first and second sub-arrays of detector pixels having first and second overlapping different wavelength dependencies of responsivity, respectively, in the infrared wavelength range, and an image forming assembly configured to form an image of the object illuminated with the fan of light beams on the first and second sub-arrays of the array of detector pixels. The 3D object imager may further include a controller operably coupled to the array of detector pixels and configured to read out the image of the object from the first and second sub-arrays of detector pixels and determine a distance to a portion of the object. An image of the portion of the object is formed on at least one detector pixel of each one of the first and second sub-arrays of detector pixels. The distance is determined based on a comparison of signals from the corresponding detector pixels of the first and second sub-arrays of detector pixels.

In some embodiments, each detector pixel of the array of detector pixels comprises first and second sub-pixels, the first sub-pixels forming the first sub-array and the second sub-pixels forming the second sub-array. The controller is configured to determine the distance based on a comparison of the signals from the first and second sub-pixels. In some embodiments, the first and second sub-arrays of detector pixels are provided with first and second spectral filters, respectively, having first and second overlapping different wavelength dependencies of throughput, respectively, for providing the first and second overlapping different wavelength dependencies of responsivity, respectively.

The infrared light source may include a polychromatic light source for emitting polychromatic light, and a dispersive element configured to receive the polychromatic light from the polychromatic light source and angularly disperse the polychromatic light into the fan of the light beams. In some embodiments, the responsivity of the first sub-array monotonically decreases with wavelength, and the responsivity of the second sub-array monotonically increases with wavelength within the infrared wavelength range. The array of detector pixels may further include a third sub-array of pixels having a third wavelength dependence of responsivity overlapping with at least the second wavelength dependence of responsivity of the second sub-array. For embodiments where the object comprises an eye, the 3D object imager may further include a wavelength-selective reflector for placing in front of the eye, and the wavelength-selective reflector may be configured to redirect light in the infrared wavelength range, and to transmit towards the eye outside light in a visible wavelength range. The light in the infrared wavelength range may include at least some light beams of the fan of light beams reflected or scattered by the eye towards the wavelength-selective reflector. The wavelength-selective reflector may include at least one of a hot mirror or a polarization volume hologram (PVH). The PVH may be a part of the image forming assembly and may have optical power for at least one of collimating or focusing the light beams reflected or scattered by the eye towards the PVH. The infrared light source may include a superluminescent light-emitting diode, for example.

In accordance with the present disclosure, there is provided a near-eye display comprising a projector for providing image light conveying an image in angular domain, a pupil expander coupled to the projector for expanding the image light over an eyebox of the near-eye display, and an eye tracker. The eye tracker includes an infrared light source for emitting a fan of light beams towards the eyebox, wherein the light beams are at different wavelengths within an infrared wavelength range; an array of detector pixels including first and second sub-arrays of detector pixels having first and second overlapping different wavelength dependencies of responsivity, respectively, in the infrared wavelength range; and an image forming assembly configured to form an image of the object illuminated with the fan of light beams on the first and second sub-arrays of the array of detector pixels. A controller may be operably coupled to the array of detector pixels and configured to read out the image of the object from the first and second sub-arrays of detector pixels, and determine a distance to a portion of the object, where an image of the portion of the object is formed on at least one detector pixel of each one of the first and second sub-arrays of detector pixels, and where the distance is determined based on a comparison of signals from the corresponding detector pixels of the first and second sub-arrays of detector pixels.

In some embodiments, the near-eye display further includes a wavelength-selective reflector coupled to the pupil expander and configured to redirect at least some light beams of the fan of light beams reflected or scattered by the eye towards the wavelength-selective reflector. The wavelength-selective reflector may include at least one of a polarization volume hologram (PVH) or a hot mirror.

In accordance with the present disclosure, there is further provided a method for three-dimensional object imaging. The method includes illuminating an object with a fan of light beams, where the light beams are at different wavelengths within an infrared wavelength range. An image of the object is formed, wherein the object is illuminated with the fan of light beams on an array of detector pixels including first and second sub-arrays of detector pixels having first and second overlapping different wavelength dependencies of responsivity, respectively, in the infrared wavelength range. The image of the object is read out from the array of detector pixels. A distance to a portion of the object is determined. An image of the portion of the object is formed on at least one detector pixel of each one of the first and second sub-arrays of detector pixels. The distance is determined based on a comparison of signals from the corresponding detector pixels of the first and second sub-arrays of detector pixels. The determining may be based on a ratio of the signals from the detector pixels of the first and second sub-arrays of detector pixels. In embodiments where the object comprises an eye, the method may further include redirecting at least some light beams of the fan of light beams reflected or scattered by the eye towards the array of detector pixels using a wavelength-selective reflector.

BRIEF DESCRIPTION OF THE DRAWINGS

Exemplary embodiments will now be described in conjunction with the drawings, in which.

DETAILED DESCRIPTION

Figure 1:
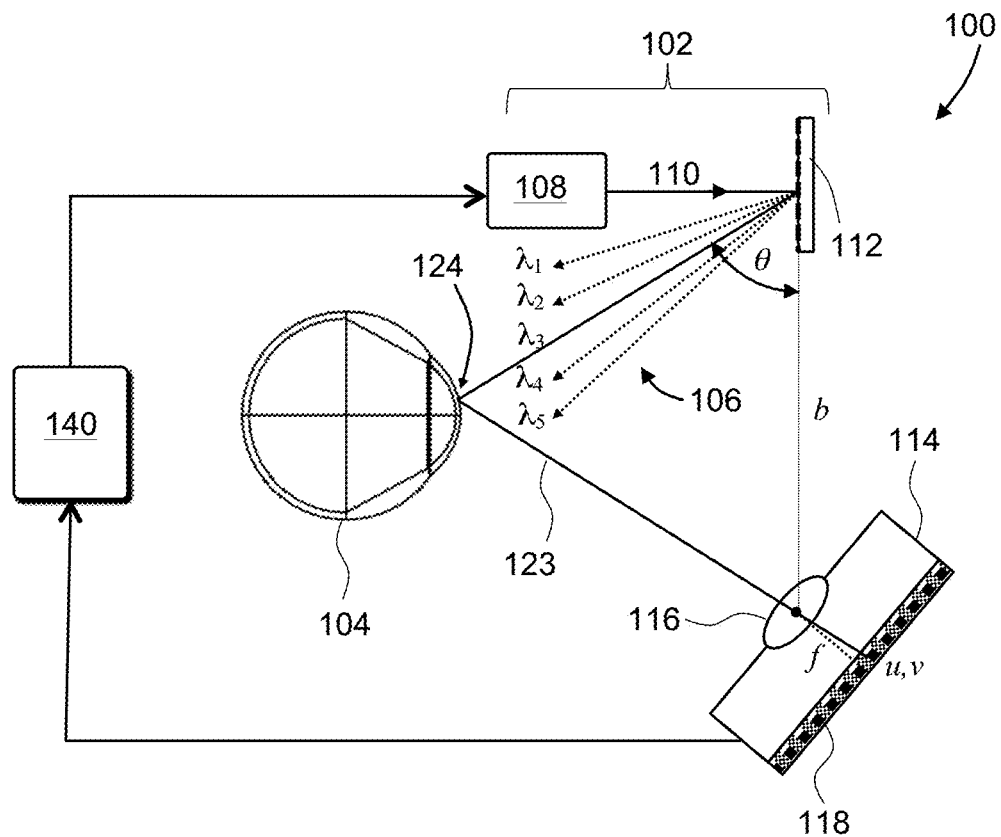
FIG. 1 is a top schematic view of a three-dimensional (3D) eye imager of this disclosure.

While the present teachings are described in conjunction with various embodiments and examples, it is not intended that the present teachings be limited to such embodiments. On the contrary, the present teachings encompass various alternatives and equivalents, as will be appreciated by those of skill in the art. All statements herein reciting principles, aspects, and embodiments of this disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

As used herein, the terms "first", "second", and so forth are not intended to imply sequential ordering, but rather are intended to distinguish one element from another, unless explicitly stated. Similarly, sequential ordering of method steps does not imply a sequential order of their execution, unless explicitly stated. In FIGS. 1, 6A, 7A, and 8A, similar reference numerals refer to similar elements.

A triangulation-based 3D imager of the present disclosure uses a fan of infrared beams at different wavelengths within an infrared wavelength range for illumination of an object, such as a human eye, for example. An image of the object is detected with a detector array including sub-pixels having different spectral responsivities within the infrared wavelength range. By comparing the sub-pixel signals, e.g. by taking a difference or a ratio of the sub-pixel signals, one may determine the wavelength of the infrared beam impinging on the sub-pixels. Since the angular orientation of the impinging infrared beam at this wavelength is known, the depth information may be obtained in addition to the reflectivity/brightness information.

Referring to FIG. 1, a three-dimensional (3D) object imager 100 includes an infrared light source 102 illuminating an object, such as an eye 104, with a fan of light beams 106. The light beams 106 are infrared light beams at different wavelengths within an infrared wavelength range. The light beams 106 are not detectable by the eye 104 since they are outside of visible spectrum of light. In the embodiment shown, the infrared light source 102 includes a polychromatic light source 108 for emitting polychromatic light 110 and a dispersive element 112, such as a diffraction grating, a prism, a hologram, etc., configured to receive the polychromatic light 110 from the polychromatic light source 108 and angularly disperse the polychromatic light 110 into the fan of the light beams 106, such that wavelengths $\lambda_1$-$\lambda_5$ of the light beams 106 are monotonically increasing, i.e.

$$\lambda_1 < \lambda_2 < \lambda_3 < \lambda_4 < \lambda_5 \qquad (1)$$

The order of the wavelengths $\lambda_1$-$\lambda_5$ of the light beams 106 may be reversed. Furthermore, separate light sources at different wavelengths may be disposed and configured to provide a fan of light beams with arbitrary wavelengths order, monotonically increasing, monotonically decreasing, or a non-monotonic order.

Figures 2A, 2B:
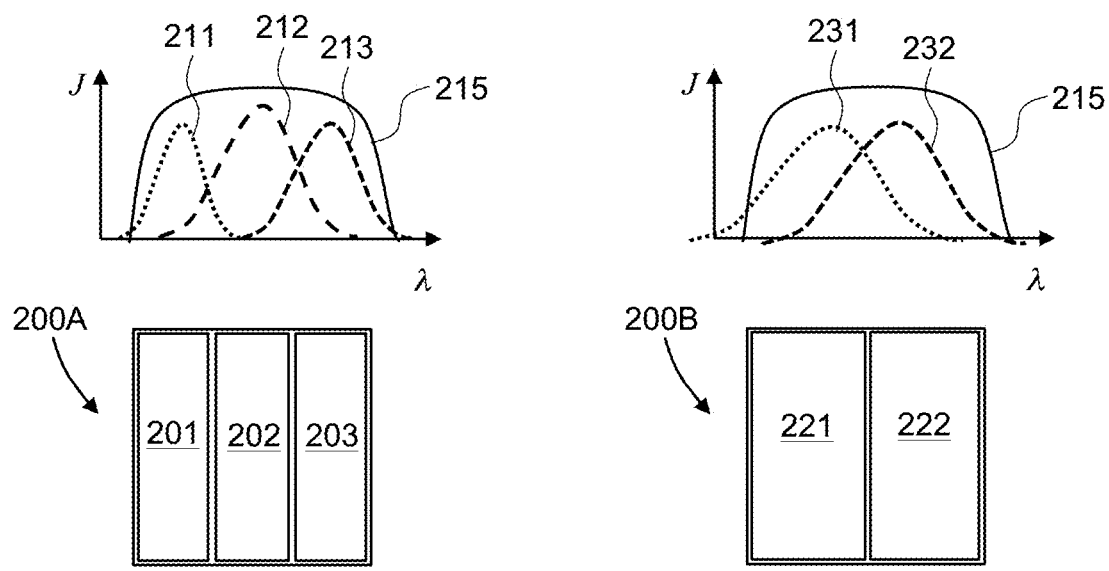
FIG. 2A is a top view of a detector pixel of a detector array embodiment of the 3D eye imager of FIG. 1, superimposed with a plot of spectral responsivity of three sub-pixels of the detector pixel.
FIG. 2B is a top view of a detector pixel of a detector array embodiment of the 3D eye imager of FIG. 1, superimposed with a plot of spectral responsivity of two sub-pixels of the detector pixel.

A camera 114 including an objective 116 and an array of detector pixels 118 is disposed to receive at least some of the light beams 106 reflected and/or scattered by the eye 104. Referring to FIG. 2A with further reference to FIG. 1, each detector pixel 200A of the array of detector pixels 118 may include first 201, second 202, and third 203 sub-pixels having first 211, second 212, and third 213 overlapping different wavelength dependencies of responsivity J, respectively. Herein, the term "responsivity" means sensitivity to light, which may be expressed as ratio of a magnitude of an electrical signal produced by a sub-pixel to the light energy impinging on that sub-pixel. The responsivity J may also be represented by a quantum yield in electrons generated vs. number of photons impinging onto a sub-pixel. Both responsivity and quantum yield may depend on wavelength; the wavelength dependence may be engineered by providing a filter matrix on top of the first 201, second 202, and third 203 subpixels, each sub-pixel receiving light through a corresponding spectral filter having the first 211, second 212, and third 213 wavelength dependencies of throughput. Since the responsivities vs. wavelength are known, the wavelength of the impinging light may be determined e.g. from a ratio of individual electric signals generated by the subpixels 201, 202, 203, and the optical power/optical energy of the impinging light may be determined from a weighted sum of the individual electric signals generated by the subpixels 201, 202, 203. Thus, each pixel 200A of the array of detector pixels 118 may provide signals indicative of both impinging light power and wavelength. An emission spectrum 215 of the polychromatic light source 108 may extend over the entire wavelength range of the polychromatic light source 108.

Referring back to FIG. 1, a light beam 123 reflects from the eye 104 at a portion 124 of the eye 104, gets focused by the objective 116, and impinges on a detector pixel with coordinates u,v of the array of detector pixels 118. Since the wavelength $\lambda_3$ of the light beam 123 can be determined as explained above with reference to FIG. 2A, its emission angle $\theta$ is also known, because it is determined by the dispersion element 112. Then, a 3D coordinate (x, y, z) of the portion 124 of the eye 104, from which the light beam 123 was reflected may be determined by triangulation, e.g. from the following relationships:

$$x = \frac{b}{f ctg\theta - u} u \qquad (2)$$

$$y = \frac{b}{f ctg\theta - u} v \qquad (3)$$

$$z = \frac{b}{f ctg\theta - u} f \qquad (4)$$

where f is a focal length of the objective 116 and b is a distance between an origin of the fan of light beams 106, i.e.

a location when the polychromatic light beam 110 impinges onto the dispersive element 112, and a center of the objective 116.

A controller 140 may be operably coupled to the array of detector pixels 118 and the light source 108. The controller 140 may be configured to energize the light source 108 to provide the polychromatic light 110 to the dispersive element 112, and illuminate the eye 104 with the fan of light beams 106. The controller 140 may be further configured to read out the image of the eye 104 from the array of detector pixels 118. As explained above, by comparing signals from different sub-pixels of each pixel, the controller 140 may determine the wavelength of light impinging on each pixel, and from that, the controller 140 may determine a distance to a portion of the object an image of which (i.e. image of the portion) is formed on at least one detector pixel of the array of detector pixels 118, by using triangulation. The specific parameters of triangulation, and the equations used depend on the geometry and color designation for different directions of the fan of optical beams 106.

Referring now to FIG. 2B with further reference to FIG. 1, a detector pixel 200B (FIG. 2B) is an embodiment of a detector pixel of the array of detector pixels 118 (FIG. 1). The detector pixel 200B includes only two sub-pixels, a first sub-pixel 221 and a second sub-pixel 222 having first 231 and second 232 wavelength dependencies of responsivity J, respectively. Each wavelength dependence 231 and 232 extends substantially over the entire wavelength range of the emission spectrum 215 of the polychromatic light source 108. The wavelength of an impinging light beam may be determined e.g. from a ratio of output electric signals of the first 221 and second 222 sub-pixel.

Figure 2C:
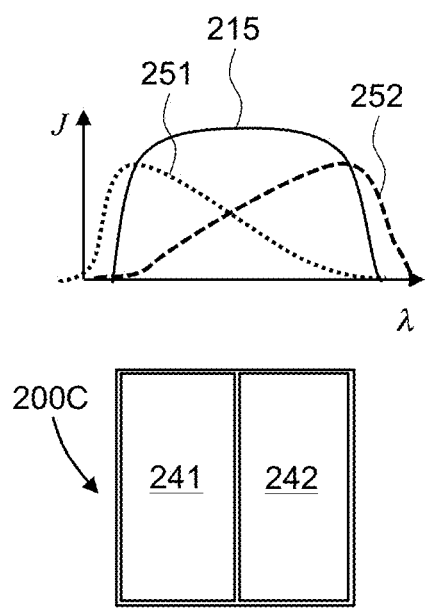
FIG. 2C is a top view of a detector pixel of a detector array embodiment of the 3D eye imager of FIG. 1, superimposed with a plot of spectral responsivity of two sub-pixels of the detector pixel, wherein the spectral responsivity comprises oppositely sloped sections.

Turning to FIG. 2C with further reference to FIG. 2B, a detector pixel 200C is an embodiment of a detector pixel of the array of detector pixels 118 (FIG. 1), and is similar to the detector pixel 200B of FIG. 2B. The detector pixel 200C of FIG. 2C also includes first 241 and second 242 sub-pixels having first 251 and second 252 wavelength dependencies of responsivity J, respectively. The responsivity 251 of the first sub-pixel 241 monotonically decreases with wavelength, and the responsivity 252 of the second sub-pixel 242 monotonically increases with wavelength within the infrared wavelength range defined by the emission spectrum 215 of the polychromatic light source 108. Notably, the responsivities 251,252 of the first 241 and second 242 sub-pixels are non-zero across the entire infrared wavelength range. This enables one to avoid division by zero in case of determining the wavelength of the impinging light from a ratio of subpixel signals. Furthermore, an advantage of monotonic spectral responsivities within the wavelength range is that the ratio of the two responsivities is also monotonic, which may reduce uncertainty of wavelength determination, and, accordingly, uncertainty of the 3D position and shape of the object being imaged. More generally, at least two sub-pixels may be provided. Providing three or more sub-pixels may enable one to cover the required wavelength range more easily, as long as light at each wavelength within that wavelength range may be detected by at least two sub-pixels having different spectral shapes of responsivity.

In some embodiments, the array of detector pixels 118 may include first and second separate sub-arrays of detector pixels having first and second overlapping different wavelength dependencies of responsivity, respectively, in the infrared wavelength range. The first and second overlapping different wavelength dependencies of responsivity may be provided by first and second separate spectral filters, respectively, having first and second overlapping different wavelength dependencies of throughput, respectively. An image forming assembly may be provided including separate objectives 116 configured for forming separate images on each sub-array of pixels and equipped with separate spectral filters. Two, three, or more sub-arrays of pixels with their own spectral filter and objective may be provided. The triangulation procedure may be adjusted accordingly to accommodate separate positions of the sub-arrays.

Figure 3A:
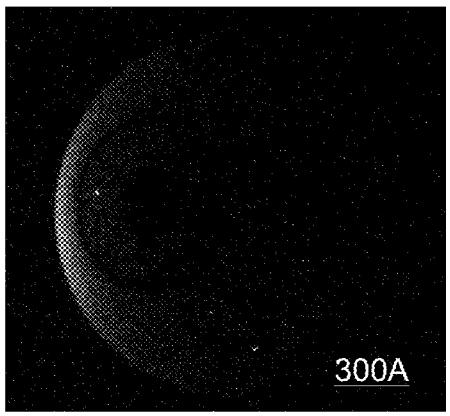
FIGS. 3A to 3C are eye images obtained using the 3D eye imager of FIG. 1 at wavelengths of 800 nm, 850 nm, and 880 nm, respectively.
Figure 3B:
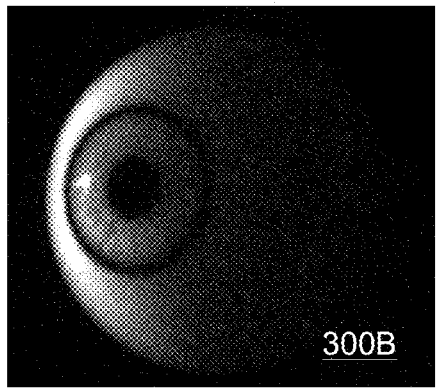
Figure 3C:
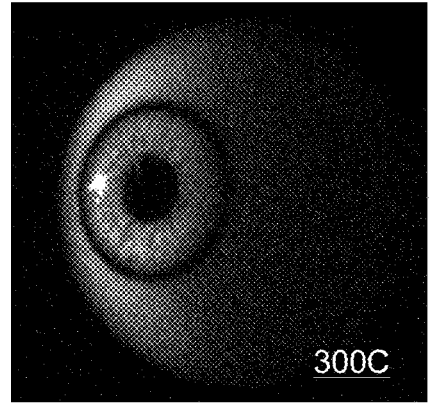

The operation of the 3D object imager 100 of FIG. 1 is illustrated in FIGS. 3A, 3B, and 3C. In this example, the polychromatic light source 108 is an infrared superluminescent light-emitting diode (SLED) providing the polychromatic light in a wavelength range of 800 nm to 900 nm. A polarization volume hologram (PVH) was used in place of the dispersing element 112. A monochromatic camera was used in place of the camera 114. Instead of different sub-pixels having different spectral responsivity in the infrared, three bulk infrared filters were placed, one at a time, in front of the camera 114. FIG. 3A shows a view 300A of the eye 104 taken through a filter having a center transmission wavelength of 800 nm; FIG. 3B shows a view 300B of the eye 104 taken through a filter having a center transmission wavelength of 850 nm; and FIG. 3C shows a view 300C of the eye 104 taken through a filter having a center transmission wavelength of 880 nm. All three bulk infrared filters had a spectral transmission full width at half maximum (FWHM) of 40 nm. The views 300A, 300B, and 300C of the eye 104 are inverted, since the objective 116 forms an inverted image due to geometry. It is seen that a light beam propagated through the 800 nm filter only illuminated the left side of the eye 104 in FIG. 3A (i.e. right side when looking straight at the eye 104 of FIG. 1, but it appears on the left side due to the inverted image). This corresponds to the wavelength $\lambda_2$ in FIG. 1. A light beam propagated through the 850 nm filter illuminated the eye 104 closer to the center, this may correspond e.g. to the wavelength $\lambda_3$ in FIG. 1. Finally, a light beam propagated through the 880 nm filter illuminated the eye 104 further closer to the center, which corresponds e.g. to the wavelength $\lambda_4$ in FIG. 1.

Figure 4A:
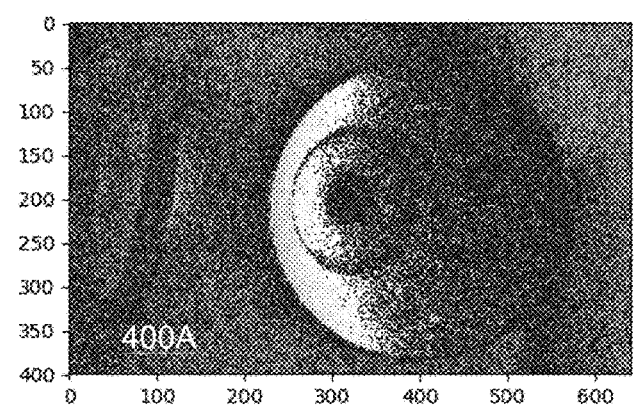
FIGS. 4A to 4C are pixel math images obtained by dividing the image of FIG. 3A by the image of FIG. 3B, the image of FIG. 3C by the image of FIG. 3B, the image of FIG. 3A by the image of FIG. 3C, respectively.
Figure 4B:
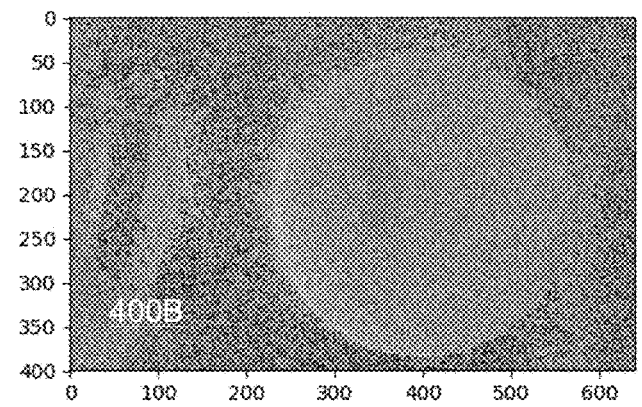
Figure 4C:
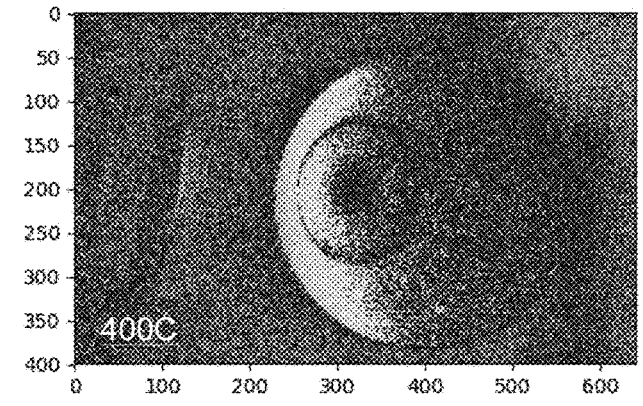

Referring to FIGS. 4A to 4C, pixel math images obtained by dividing one image of FIGS. 3A to 3C by another image of FIGS. 3A to 3C are presented. Herein, the term "pixel math" means that a magnitude of a pixel of an image of FIGS. 4A to 4C was obtained by performing an arithmetic operation with values of a corresponding pixel (i.e. having the same pixel coordinates u,v) of two images of FIGS. 3A to 3C. Specifically, an image 400A of FIG. 4A has been obtained by dividing pixel values of the image 300A of FIG. 3A (800 nm filter) by pixel values of the image 300B of FIG. 3B (850 nm filter). An image 400B of FIG. 4B has been obtained by dividing pixel values of the image 300C of FIG. 3C (880 nm filter) by pixel values of the image 300B of FIG. 3B (850 nm filter). An image 400C of FIG. 4C has been obtained by dividing pixel values of the image 300A of FIG. 3A (800 nm filter) by pixel values of the image 300C of FIG. 3C (880 nm filter).

Figure 5:
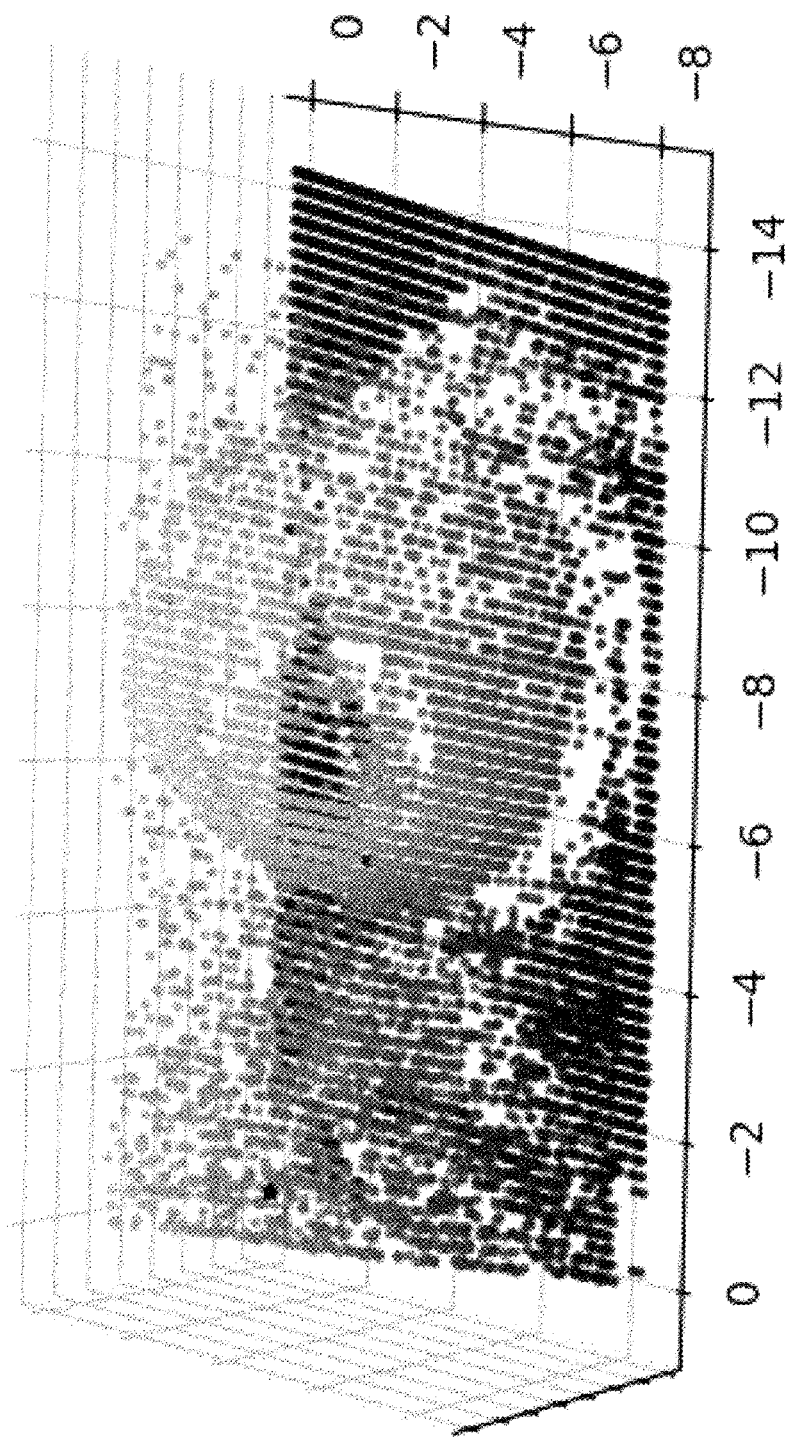
FIG. 5 is a reconstructed depth map of the eye image from the pixel math images of FIGS. 4A to 4C.

Turning to FIG. 5, the images 400A, 400B, and 400C of FIGS. 4A, 4B and 4C respectively have been processed using Eqs. (2) to (4) above to obtain a 3D map of the eye 104. It is seen that a 3D shape of the eye 104 is reproduced, proving the operation of the 3D object imager 100 of FIG. 1.

Figure 6A:
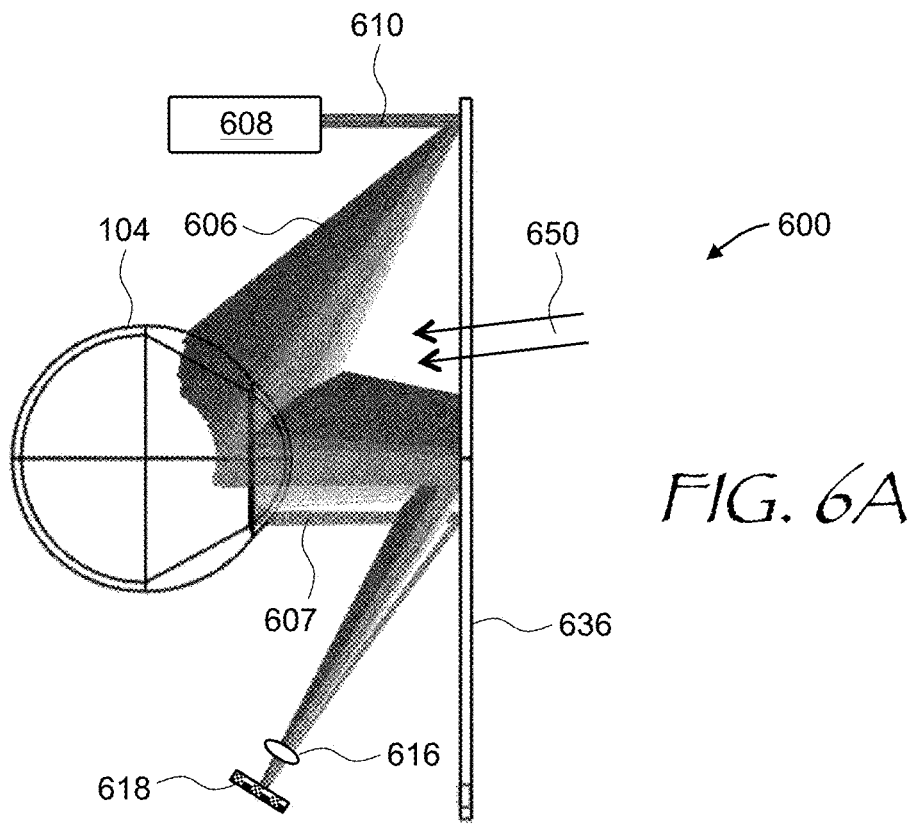
FIG. 6A is a top schematic view of a three-dimensional (3D) eye imager having a light source and a detector array on different sides of the eye being imaged, and a wavelength-selective reflector in front of the eye being imaged.

Referring to FIG. 6A, a 3D object imager 600 is an embodiment of the 3D object imager 100 of FIG. 1. The 3D object imager 600 of FIG. 6 includes a SLED 608 illuminating a PVH 636 with polychromatic light 610, a lens 616 receiving light 607 that has been reflected and/or scattered by the eye 104, and an array of detector pixels 618 for detecting the received light. The PVH 636 is a volume hologram formed in an optically anisotropic medium such as liquid crystals. In a PVH, the focusing and diffractive properties may be made polarization-dependent. Like a conventional hologram formed in an isotropic medium by creating local variations in refractive index and/or absorption, a PVH may diffract, redirect, and/or focus/defocus light, i.e. a PVH may have an optical power. One difference of a PVH from a conventional hologram is that optical properties of a PVH may be polarization dependent.

The PVH 636 may have a double function in the 3D object imager 600. The first function of the PVH 636 is to angularly disperse the polychromatic light 610 into a fan of light beams 606. The second function of the PVH 636 is to redirect the reflected/scattered light 607 towards the array of detector pixels 618, while letting through outside light 650 in the visible part of the spectrum, so as to enable the observation of the outside world by the eye 104. Depending on the configuration of the PVH 636, the PVH 636 may also participate in re-focusing the reflected/scattered light 607 onto the array of detector pixels 618, while having zero optical power (i.e. not focusing or defocusing power) for the outside visible light. In other words, the PVH 636 may have optical power for at least one of collimating or focusing the light beams 607 reflected or scattered by the eye 104 towards the PVH 636, while transmitting the outside visible light without substantial changes. Thus, the PVH 636 may be a part of an image forming assembly configured to form an image of the eye 106 illuminated with the fan of light beams 606 on the array of detector pixels 618. The PVH 636 may be also configured for reducing an optical aberration of the image forming assembly, if required.

In some embodiments, the lens 616 (or another focusing element performing the function of a camera objective) may be entirely omitted, and all focusing may be done by the PVH 636. The PVH 636 may be replaced by a pair of optical elements, one—e.g. a diffraction grating—for angularly dispersing the polychromatic light 610, and the other—e.g. a wavelength-selective reflector—for redirecting the reflected/scattered light 607, while transmitting the outside light in a visible wavelength range.

Figure 6B:
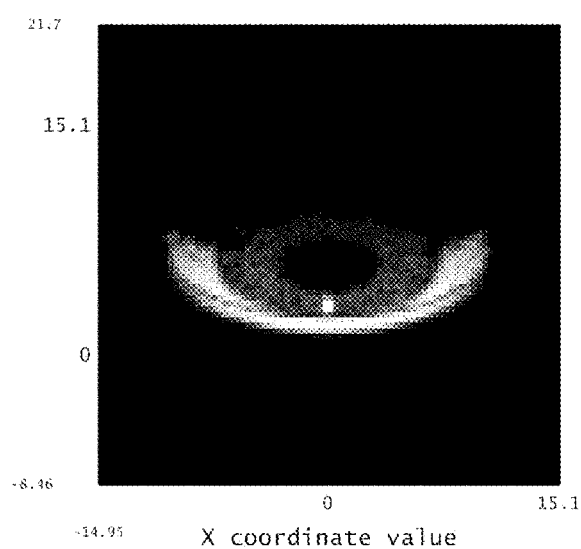
FIG. 6B is an image obtained by the 3D eye imager of FIG. 6A.

An image of the eye 104 detected by the array of detector pixels 618 of the 3D object imager 600 of FIG. 6A is presented in FIG. 6B. Different wavelengths of the fan of light beams 606 are prevalent in different parts of the image.

Figure 7A:
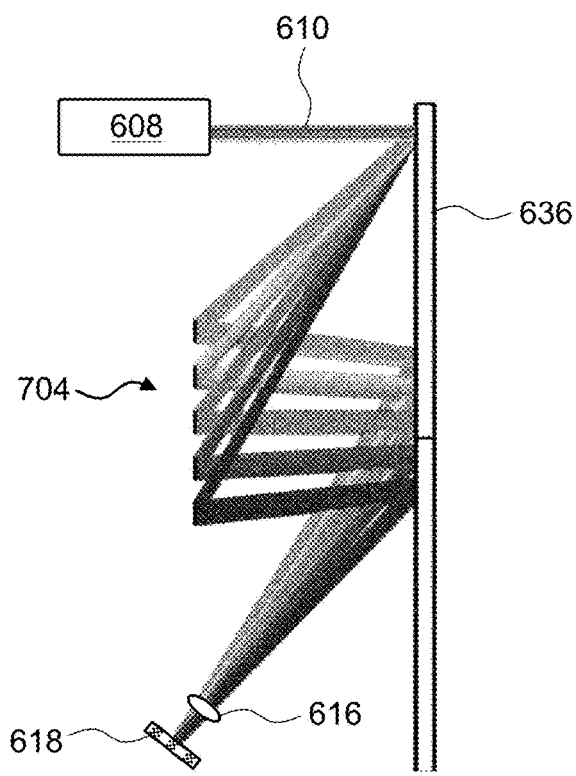
FIG. 7A is a test configuration for the 3D imager of FIG. 6A with a test grating placed instead of the eye.
Figure 7B:
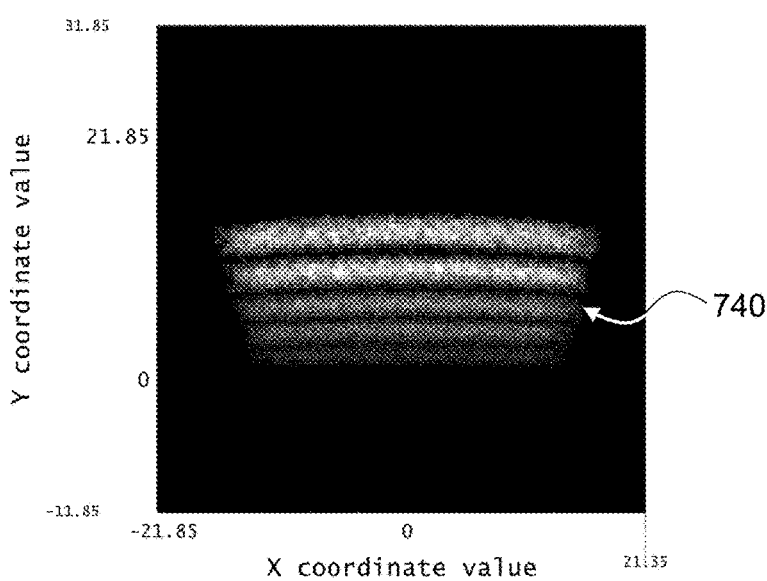
FIG. 7B is an image of the test grating obtained by the 3D imager of FIG. 7A, different stripes of the test grating at different wavelengths.

Referring to FIG. 7A, a test of the 3D object imager 600 has been performed with a test grating structure 704 replacing the eye 104. The test grating structure 704 includes a plurality of 2-3 mm thick diffuse reflectors disposed parallel to each other, as shown. A detected image is illustrated in FIG. 7B, where individual bars 740 represent individual grating lines of the test grating structure 704 illuminated with light at different wavelengths. The individual bars 740 have different colors, which correspond to detected light at different wavelengths. In other words, different wavelengths of the fan of light beams 606 are prevalent in different bars of the image of FIG. 7B.

Figure 8A:
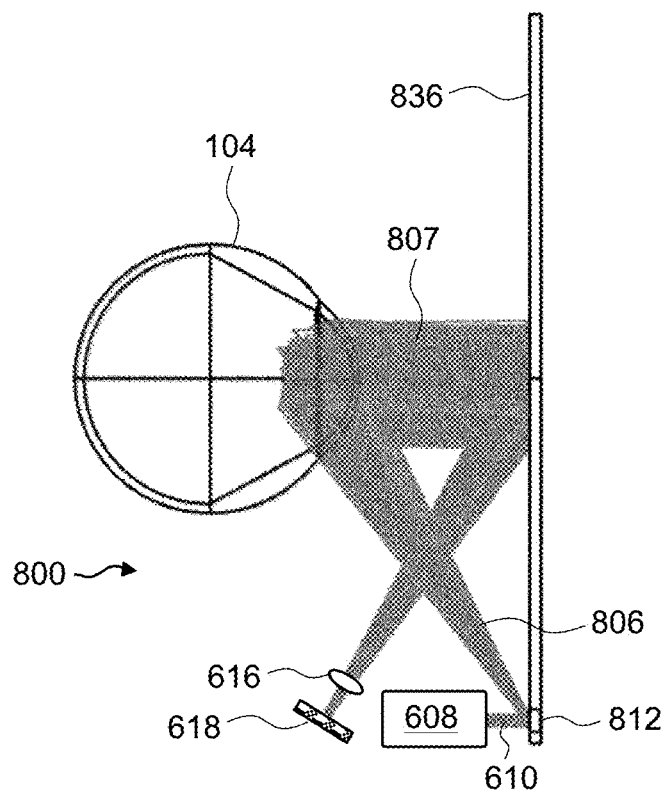
FIG. 8A is a top schematic view of a three-dimensional (3D) eye imager having a light source and a detector array a same side of the eye being imaged, and a wavelength-selective reflector in front of the eye being imaged.

Referring now to FIG. 8A, a 3D object imager 800 is an embodiment of the 3D scanner 600 of FIG. 6. The 3D object imager 800 of FIG. 8 includes the SLED 608, the lens 616 receiving light 807 that has been reflected and/or scattered by the eye 104, and the array of detector pixels 618 for detecting the received light. In the 3D scanner 800, the SLED 608 and the array of detector pixels 618 are disposed on a same side of the eye 104. The SLED 608 illuminates a polarization volume grating (PVG) 812 with the polychromatic light 610. The PVG 812 is a PVH configured to disperse the polychromatic light 610 upwards in FIG. 8A. In other words, the PVG 812 receives the polychromatic light 610 and angularly disperses the polychromatic light 610 into a fan of light beams 806 illuminating the eye 104. The reflected/scattered light 807 impinges onto a PVH 836, which redirects the reflected/scattered light 807 downwards in FIG. 8A, and towards the lens 616 and the array of detector pixels 618. The PVG 812 and the PVH 836 redirect light in different directions. The PVG 812 and the PVH 836 may be separate elements, or the may be a single, spatially variant PVH. Herein, the term "spatially variant" means that the direction in which the light is diffracted, relative to the impinging light beam, varies across the PVH surface. In some embodiments, the lens 616 (or another focusing element performing the function of a camera objective) may be entirely omitted, and all focusing may be done by the PVH 836. In other words, the image forming assembly of the 3D object imager 800 may include the PVH 836 and other elements, or only the PVH 836.

Figure 8B:
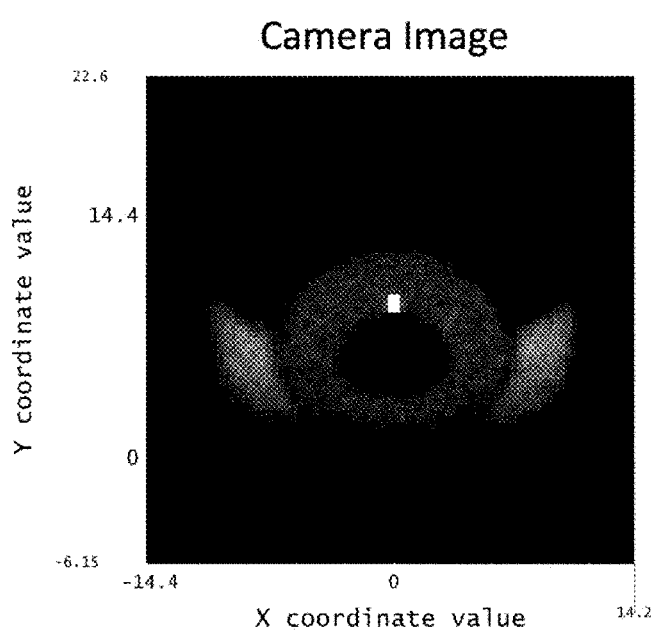
FIG. 8B is an image obtained by the 3D eye imager of FIG. 8A.

An image of the eye 104 detected by the array of detector pixels 618 of the 3D object imager 800 of FIG. 8A is presented in FIG. 8B. Different wavelengths of the fan of light beams 806 are prevalent in different parts of the image.

Figure 9:
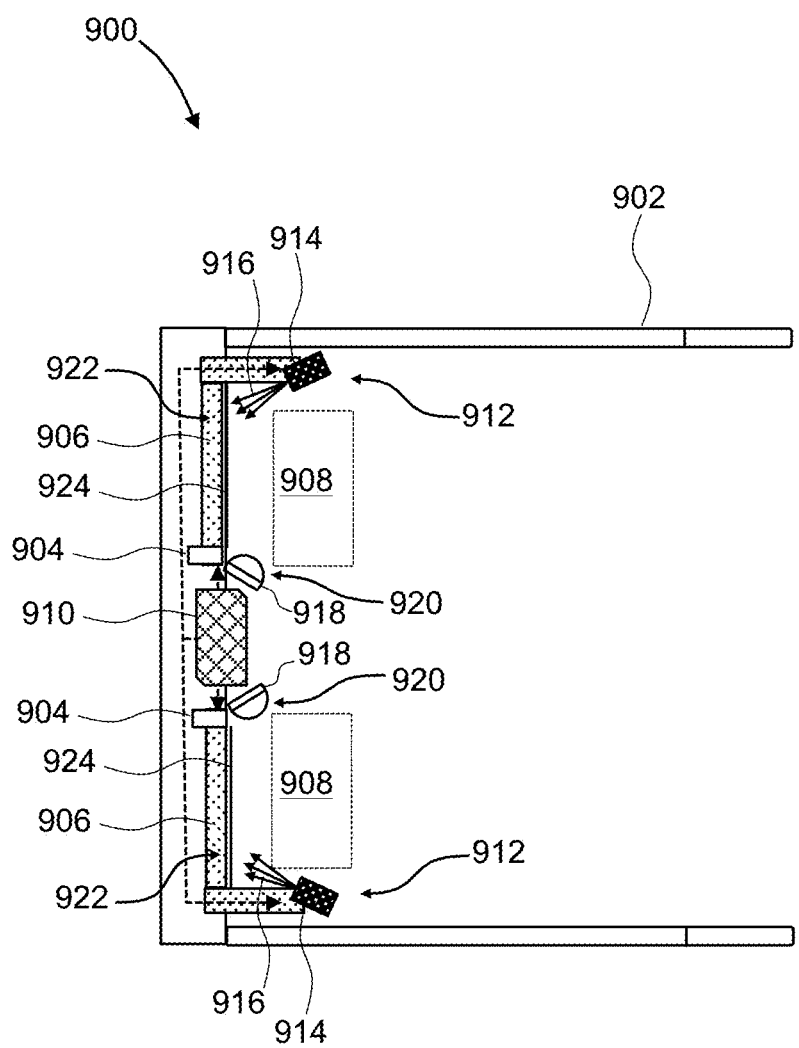
FIG. 9 is a top schematic view of a near-eye display including an eye imager disclosed herein.

Referring to FIG. 9, a near-eye display 900 has a form factor of a pair of eyeglasses including a body or frame 902 supporting a pair of miniature projectors 904 providing image light conveying images in angular domain to a pair of pupil expanders 906 coupled to the projectors 904 for expanding the image light over eyeboxes 908 of the near-eye display 900. Herein, the term "eyebox" means a geometrical area where an image of acceptable quality may be presented to user's eyes, not shown. A display controller 910 is operably coupled to the projectors 902 for providing images to left and right eyes of the user.

An eye tracker 912 may be provided for each eyebox 908. The eye tracker 912 may be an embodiment of the 3D object imager 100 of FIG. 1, 3D object imager 600 of FIG. 6A, or 3D object imager 800 of FIG. 8A, for example. The eye tracker 912 may include an infrared light source 914 for emitting a fan of light beams 916 towards the eyebox 908. Individual light beams of the fan of light beams 916 are at different wavelengths within an infrared wavelength range. A camera 920 including an array of detector pixels 918 may be provided. The array may include first and second sub-arrays of detector pixels having first and second overlapping different wavelength dependencies of responsivity, respectively, in the infrared wavelength range. In some embodiments, the first and second sub-arrays may be separate and may be coupled to separate spectral filters, providing the different wavelength dependencies of responsivity, and different objectives or objective portions configured for forming separate images on the sub-arrays. In some embodiments, each detector pixel of the array 918 may include first and second sub-pixels having first and second overlapping different wavelength dependencies of responsivity, respectively, in the infrared wavelength range, as has been explained above with reference to FIGS. 2B and 2C. The controller 910 may be configured to also operate the eye tracker 912, i.e. energize the infrared light sources 914, read out the eye images from the arrays of detector pixels 918, and process the data to extract the depth information required to reconstruct a 3D image of each eye. From the 3D images of both eyes, a gaze direction and vergence (i.e. convergence distance of the gaze directions) of the user's eyes may be determined. To provide the 3D imaging or eye depth mapping, the controller 910 may be configured to determine, for each pixel, or for at least some pixels, a distance to a portion of the eye an image of which is formed on the detector pixel or pixels, based on signals from the sub-pixels of these pixels.

An image forming assembly 922 may be provided for each eye. The image forming assembly 922 may be configured to form an image of the eye illuminated with the fan of light beams on the array of detector pixels 918. To that end, the image forming assembly 922 may include a lens in the camera 920 and/or a PVH 924 configured to collimate, refocus, and/or counterbalance optical aberration(s) in the beam path redirecting the scattered infrared light towards the camera 920. Advantageously, the PVH 924 may remain substantially transparent to the outside light, enabling the user of the near-eye display 900 to observe the outside world while operating the near-eye display 900 to view augmented reality images, for example. A wavelength-selective reflector, other than a PVH, may be used in place of the PVH 924. By way of a non-limiting example, a so-called hot mirror, i.e. a reflector transmitting visible light while reflecting infrared light, may be used in place of the PVH 924.

Figure 10:
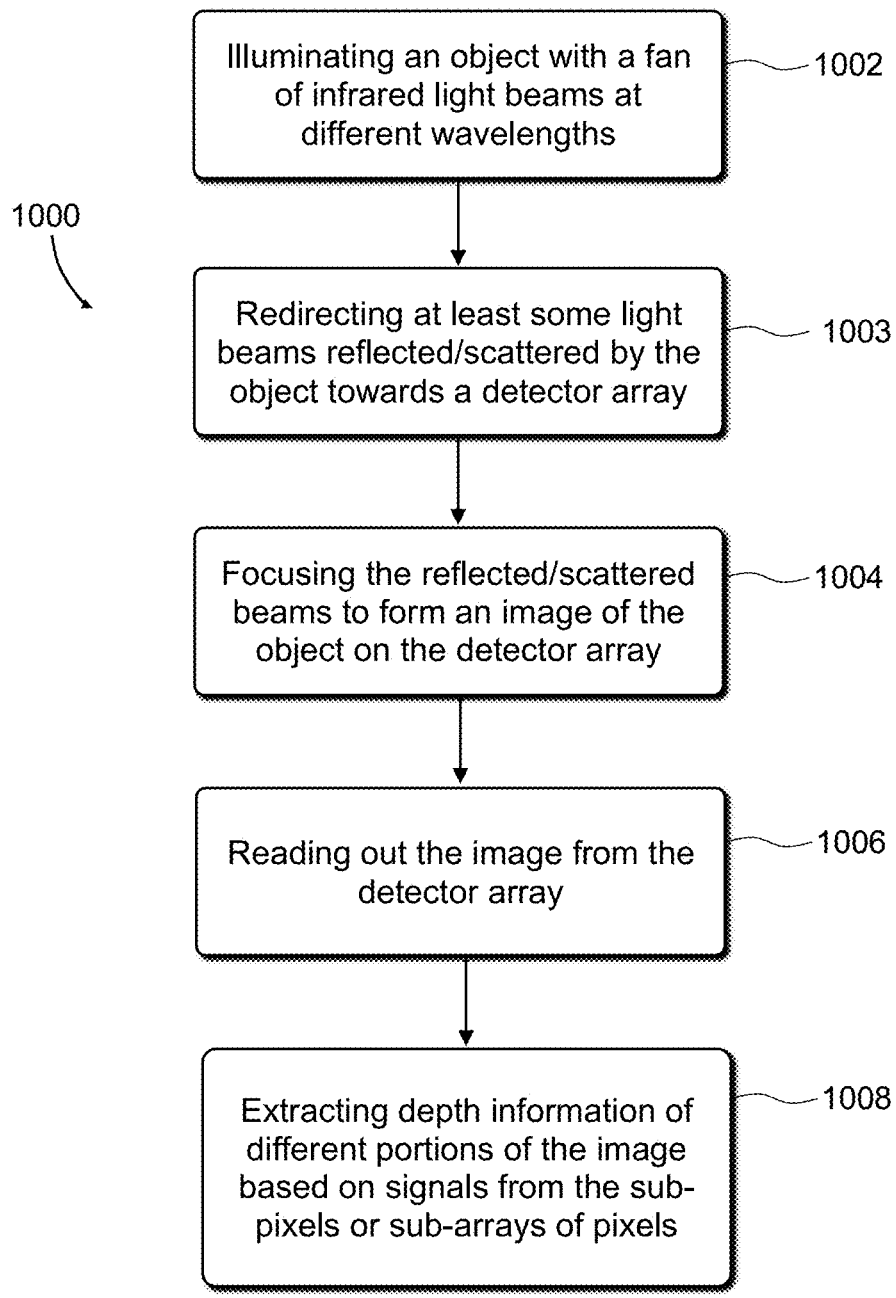
FIG. 10 is a flow chart of a method for three-dimensional imaging in accordance with this disclosure.

Turning to FIG. 10, a method 1000 of this disclosure for three-dimensional object imaging includes illuminating (1002) an object, such as the user's eye 104, with a fan of light beams. Different light beams are at different wavelengths within an infrared wavelength range. An image of the object illuminated with the fan of light beams is formed (1004) on an array of detector pixels, e.g. the array 118 of FIG. 1, the array 618 of FIG. 6A and FIG. 8A, or the array 918 of FIG. 9. As explained above, the array may include first and second sub-arrays of detector pixels having first and second overlapping different wavelength dependencies of responsivity, respectively, in the infrared wavelength range. In some embodiments, the first and second sub-arrays may be separate and may be coupled to separate spectral filters and objectives. In some embodiments, each pixel of the array may include at least first and second sub-pixels (e.g. the first sub-pixel 221 and the second sub-pixel 222 of FIG. 2B) having first and second overlapping different wavelength dependencies of responsivity, respectively, in the infrared wavelength range. The image is then read out (1006) from the array of detector pixels. A distance may be determined (1008) to a portion of the object an image of which is formed on at least one detector pixel of the array of detector pixels, based on signals from the first and second sub-pixels of the at least one detector pixel of the array of detector pixels. The determining may be based on a ratio of the signals from the first and second sub-pixels, as has been explained above with reference to FIG. 1 and FIGS. 2A to 2C, and illustrated with the examples of FIGS. 3A to 3C and 4A to 4C.

In some embodiments of the 3D imaging method 1000, it may be desirable to have optical access to the object being imaged in the visible part of the spectrum. For example, for eye imaging, it may be desirable to be able to leave the eye's field of view unobscured by the 3D imager. For such embodiments, the method 1000 may further include redirecting (1003) of the fan of light beams reflected or scattered by the eye towards the array of detector pixels using a wavelength-selective reflector such as a hot mirror or a PVH.

Embodiments of the present disclosure may include, or be implemented in conjunction with, an artificial reality system. An artificial reality system adjusts sensory information about outside world obtained through the senses such as visual information, audio, touch (somatosensation) information, acceleration, balance, etc., in some manner before presentation to a user. By way of non-limiting examples, artificial reality may include virtual reality (VR), augmented reality (AR), mixed reality (MR), hybrid reality, or some combination and/or derivatives thereof. Artificial reality content may include entirely generated content or generated content combined with captured (e.g., real-world) content. The artificial reality content may include video, audio, somatic or haptic feedback, or some combination thereof. Any of this content may be presented in a single channel or in multiple channels, such as in a stereo video that produces a three-dimensional effect to the viewer. Furthermore, in some embodiments, artificial reality may also be associated with applications, products, accessories, services, or some combination thereof, that are used to, for example, create content in artificial reality and/or are otherwise used in (e.g., perform activities in) artificial reality. The artificial reality system that provides the artificial reality content may be implemented on various platforms, including a wearable display such as an HMD connected to a host computer system, a standalone HMD, a near-eye display having a form factor of eyeglasses, a mobile device or computing system, or any other hardware platform capable of providing artificial reality content to one or more viewers.

Figure 11A:
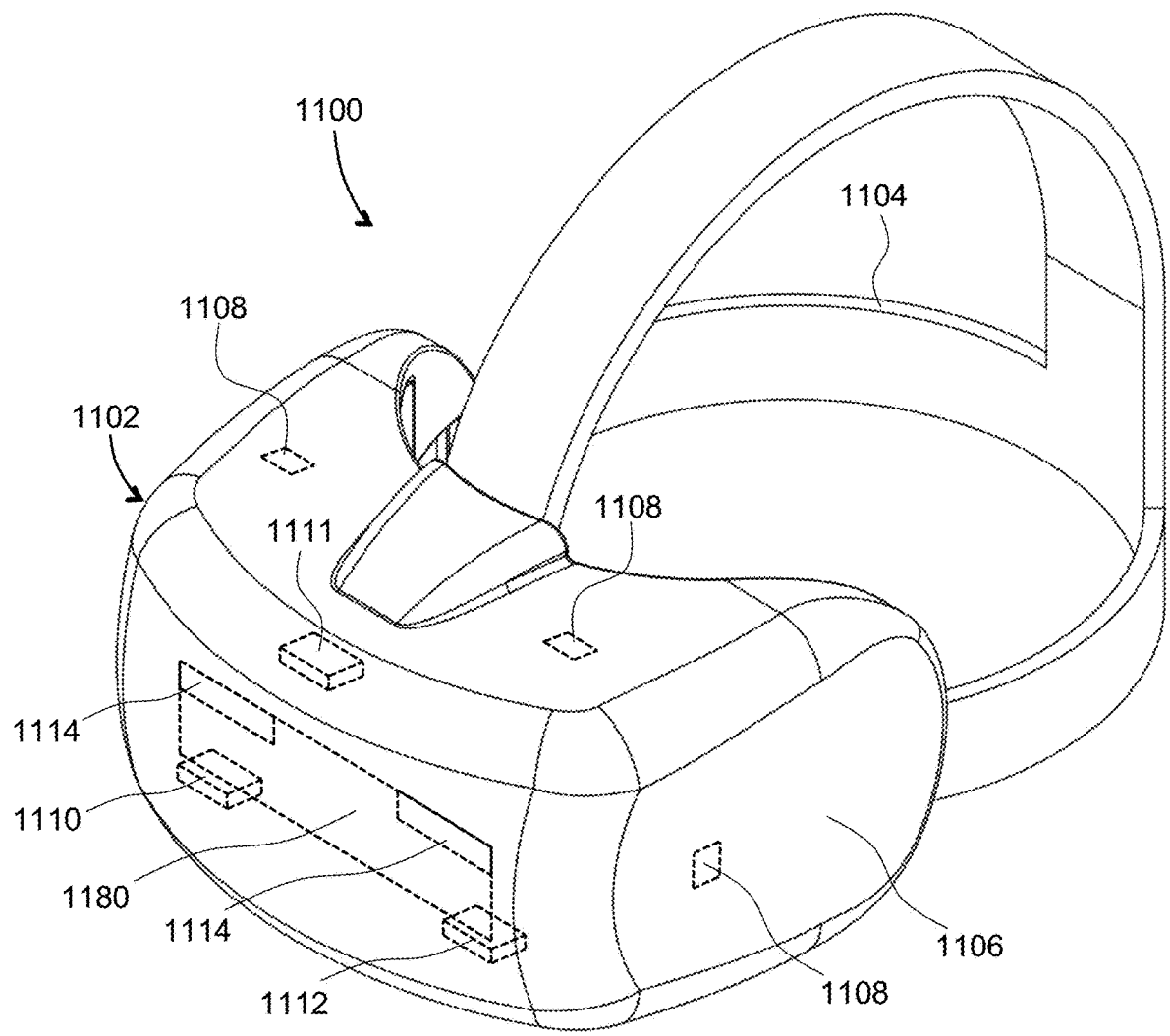
FIG. 11A is an isometric view of a head-mounted display of the present disclosure.

Referring to FIG. 11A, an HMD 1100 is an example of an AR/VR wearable display system which encloses the user's face, for a greater degree of immersion into the AR/VR environment. The HMD 1100 is an embodiment of the near-eye display 900 of FIG. 9. The function of the HMD 1100 is to augment views of a physical, real-world environment with computer-generated imagery, and/or to generate the entirely virtual 3D imagery. The HMD 1100 may include a front body 1102 and a band 1104. The front body 1102 is configured for placement in front of eyes of a user in a reliable and comfortable manner, and the band 1104 may be stretched to secure the front body 1102 on the user's head. A display system 1180 may be disposed in the front body 1102 for presenting AR/VR imagery to the user. Sides 1106 of the front body 1102 may be opaque or transparent.

In some embodiments, the front body 1102 includes locators 1108 and an inertial measurement unit (IMU) 1110 for tracking acceleration of the HMD 1100, and position sensors 1112 for tracking position of the HMD 1100. The IMU 1110 is an electronic device that generates data indicating a position of the HMD 1100 based on measurement signals received from one or more of position sensors 1112, which generate one or more measurement signals in response to motion of the HMD 1100. Examples of position sensors 1112 include: one or more accelerometers, one or more gyroscopes, one or more magnetometers, another suitable type of sensor that detects motion, a type of sensor used for error correction of the IMU 1110, or some combination thereof. The position sensors 1112 may be located external to the IMU 1110, internal to the IMU 1110, or some combination thereof.

The locators 1108 are traced by an external imaging device of a virtual reality system, such that the virtual reality system can track the location and orientation of the entire HMD 1100. Information generated by the IMU 1110 and the position sensors 1112 may be compared with the position and orientation obtained by tracking the locators 1108, for improved tracking accuracy of position and orientation of the HMD 1100. Accurate position and orientation is important for presenting appropriate virtual scenery to the user as the latter moves and turns in 3D space.

The HMD 1100 may further include a depth camera assembly (DCA) 1111, which captures data describing depth information of a local area surrounding some or all of the HMD 1100. To that end, the DCA 1111 may include a laser radar (LIDAR), or a similar device. The depth information may be compared with the information from the IMU 1110, for better accuracy of determination of position and orientation of the HMD 1100 in 3D space.

The HMD 1100 may further include an eye tracking system 1114 for determining orientation and position of user's eyes in real time. The eye tracking system 1114 may be based on the 3D object imager 100 of FIG. 1, the 3D object imager 600 of FIG. 6A, or the 3D object imager 800 of FIG. 8A, for example. The obtained position and orientation of the eyes also allows the HMD 1100 to determine the gaze direction of the user and to adjust the image generated by the display system 1180 accordingly. In one embodiment, the vergence, that is, the convergence angle of the user's eyes gaze, is determined. The determined gaze direction and vergence angle may also be used for real-time compensation of visual artifacts dependent on the angle of view and eye position. Furthermore, the determined vergence and gaze angles may be used for interaction with the user, highlighting objects, bringing objects to the foreground, creating additional objects or pointers, etc. An audio system may also be provided including e.g. a set of small speakers built into the front body 1102.

Figure 11B:
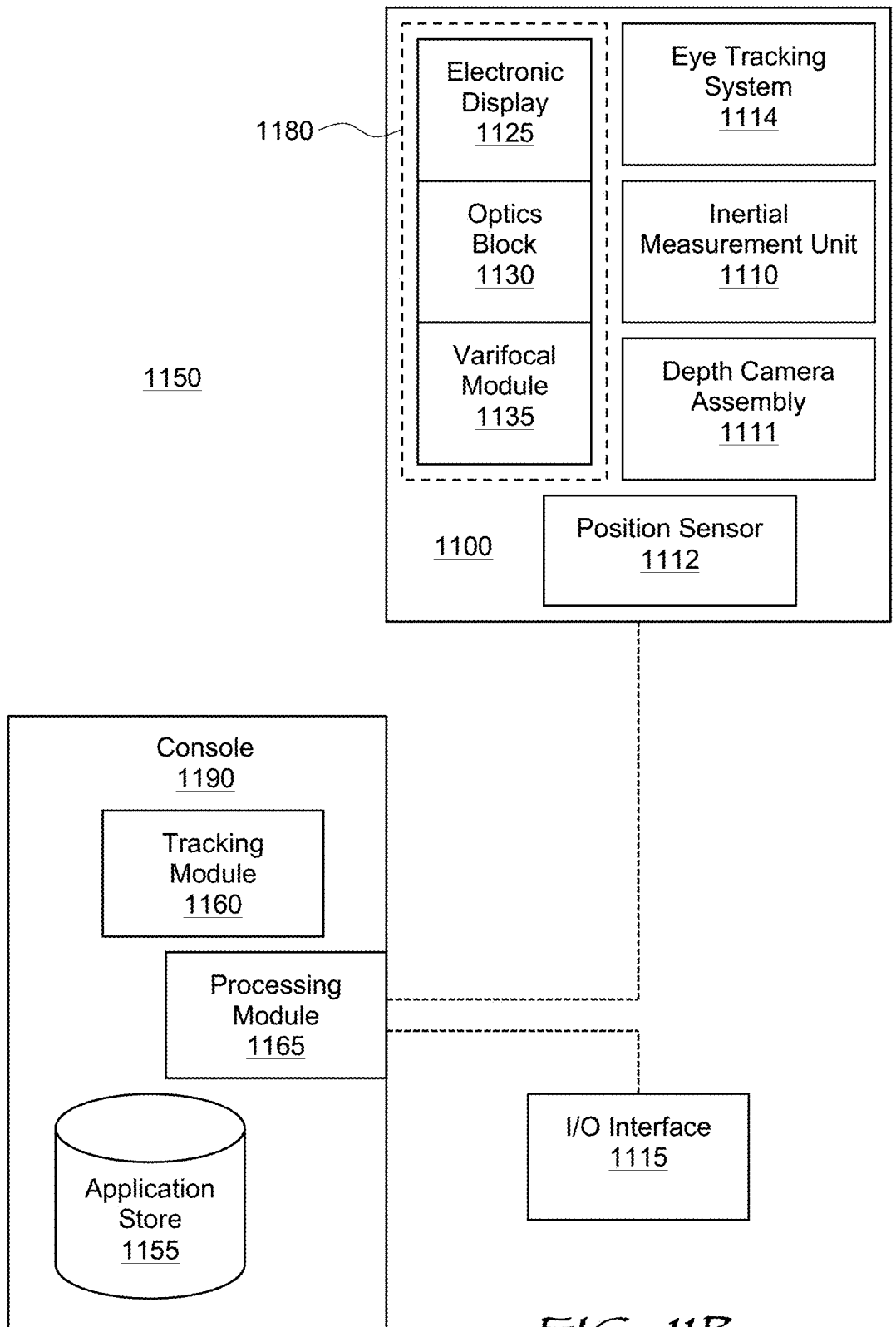
FIG. 11B is a block diagram of a virtual reality system including the headset of FIG. 11A.

Referring to FIG. 11B, an AR/VR system 1150 includes the HMD 1100 of FIG. 11A, an external console 1190 storing various AR/VR applications, setup and calibration procedures, 3D videos, etc., and an input/output (I/O) interface 1115 for operating the console 1190 and/or interacting with the AR/VR environment. The HMD 1100 may be "tethered" to the console 1190 with a physical cable, or connected to the console 1190 via a wireless communication link such as Bluetooth®, Wi-Fi, etc. There may be multiple HMDs 1100, each having an associated I/O interface 1115, with each HMD 1100 and I/O interface(s) 1115 communicating with the console 1190. In alternative configurations, different and/or additional components may be included in the AR/VR system 1150. Additionally, functionality described in conjunction with one or more of the components shown in FIGS. 11A and 11B may be distributed among the components in a different manner than described in conjunction with FIGS. 11A and 11B in some embodiments. For example, some or all of the functionality of the console 1115 may be provided by the HMD 1100, and vice versa. The HMD 1100 may be provided with a processing module capable of achieving such functionality.

As described above with reference to FIG. 11A, the HMD 1100 may include the eye tracking system 1114 (FIG. 11B) for tracking eye position and orientation, determining gaze angle and convergence angle, etc., the IMU 1110 for determining position and orientation of the HMD 1100 in 3D space, the DCA 1111 for capturing the outside environment, the position sensor 1112 for independently determining the position of the HMD 1100, and the display system 1180 for displaying AR/VR content to the user. The display system 1180 includes (FIG. 11B) an electronic display 1125, for example and without limitation, a liquid crystal display (LCD), an organic light emitting display (OLED), an inorganic light emitting display (ILED), an active-matrix organic light-emitting diode (AMOLED) display, a transparent organic light emitting diode (TOLED) display, a projector, or a combination thereof. The display system 1180 further includes an optics block 1130, whose function is to convey the images generated by the electronic display 1125 to the user's eye. The optics block may include various lenses, e.g. a refractive lens, a Fresnel lens, a diffractive lens, an active or passive Pancharatnam-Berry phase (PBP) lens, a liquid lens, a liquid crystal lens, etc., a pupil-replicating waveguide, grating structures, coatings, etc. The display system 1180 may further include a varifocal module 1135, which may be a part of the optics block 1130. The function of the varifocal module 1135 is to adjust the focus of the optics block 1130 e.g. to compensate for vergence-accommodation conflict, to correct for vision defects of a particular user, to offset aberrations of the optics block 1130, etc.

The I/O interface 1115 is a device that allows a user to send action requests and receive responses from the console 1190. An action request is a request to perform a particular action. For example, an action request may be an instruction to start or end capture of image or video data or an instruction to perform a particular action within an application. The I/O interface 1115 may include one or more input devices, such as a keyboard, a mouse, a game controller, or any other suitable device for receiving action requests and communicating the action requests to the console 1190. An action request received by the I/O interface 1115 is communicated to the console 1190, which performs an action corresponding to the action request. In some embodiments, the I/O interface 1115 includes an IMU that captures calibration data indicating an estimated position of the I/O interface 1115 relative to an initial position of the I/O interface 1115. In some embodiments, the I/O interface 1115 may provide haptic feedback to the user in accordance with instructions received from the console 1190. For example, haptic feedback can be provided when an action request is received, or the console 1190 communicates instructions to the I/O interface 1115 causing the I/O interface 1115 to generate haptic feedback when the console 1190 performs an action.

The console 1190 may provide content to the HMD 1100 for processing in accordance with information received from one or more of: the IMU 1110, the DCA 1111, the eye tracking system 1114, and the I/O interface 1115. In the example shown in FIG. 11B, the console 1190 includes an application store 1155, a tracking module 1160, and a processing module 1165. Some embodiments of the console 1190 may have different modules or components than those described in conjunction with FIG. 11B. Similarly, the functions further described below may be distributed among components of the console 1190 in a different manner than described in conjunction with FIGS. 11A and 11B.

The application store 1155 may store one or more applications for execution by the console 1190. An application is a group of instructions that, when executed by a processor, generates content for presentation to the user. Content generated by an application may be in response to inputs received from the user via movement of the HMD 1100 or the I/O interface 1115. Examples of applications include: gaming applications, presentation and conferencing applications, video playback applications, or other suitable applications.

The tracking module 1160 may calibrate the AR/VR system 1150 using one or more calibration parameters and may adjust one or more calibration parameters to reduce error in determination of the position of the HMD 1100 or the I/O interface 1115. Calibration performed by the tracking module 1160 also accounts for information received from the IMU 1110 in the HMD 1100 and/or an IMU included in the I/O interface 1115, if any. Additionally, if tracking of the HMD 1100 is lost, the tracking module 1160 may re-calibrate some or all of the AR/VR system 1150.

The tracking module 1160 may track movements of the HMD 1100 or of the I/O interface 1115, the IMU 1110, or some combination thereof. For example, the tracking module 1160 may determine a position of a reference point of the HMD 1100 in a mapping of a local area based on information from the HMD 1100. The tracking module 1160 may also determine positions of the reference point of the HMD 1100 or a reference point of the I/O interface 1115 using data indicating a position of the HMD 1100 from the IMU 1110 or using data indicating a position of the I/O interface 1115 from an IMU included in the I/O interface 1115, respectively. Furthermore, in some embodiments, the tracking module 1160 may use portions of data indicating a position or the HMD 1100 from the IMU 1110 as well as representations of the local area from the DCA 1111 to predict a future location of the HMD 1100. The tracking module 1160 provides the estimated or predicted future position of the HMD 1100 or the I/O interface 1115 to the processing module 1165.

The processing module 1165 may generate a 3D mapping of the area surrounding some or all of the HMD 1100 ("local area") based on information received from the HMD 1100. In some embodiments, the processing module 1165 determines depth information for the 3D mapping of the local area based on information received from the DCA 1111 that is relevant for techniques used in computing depth. In various embodiments, the processing module 1165 may use the depth information to update a model of the local area and generate content based in part on the updated model.

The processing module 1165 executes applications within the AR/VR system 1150 and receives position information, acceleration information, velocity information, predicted future positions, or some combination thereof, of the HMD 1100 from the tracking module 1160. Based on the received information, the processing module 1165 determines content to provide to the HMD 1100 for presentation to the user. For example, if the received information indicates that the user has looked to the left, the processing module 1165 generates content for the HMD 1100 that mirrors the user's movement in a virtual environment or in an environment augmenting the local area with additional content. Additionally, the processing module 1165 performs an action within an application executing on the console 1190 in response to an action request received from the I/O interface 1115 and provides feedback to the user that the action was performed. The provided feedback may be visual or audible feedback via the HMD 1100 or haptic feedback via the I/O interface 1115.

In some embodiments, based on the eye tracking information (e.g., orientation of the user's eyes) received from the eye tracking system 1114, the processing module 1165 determines resolution of the content provided to the HMD 1100 for presentation to the user on the electronic display 1125. The processing module 1165 may provide the content to the HMD 1100 having a maximum pixel resolution on the electronic display 1125 in a foveal region of the user's gaze. The processing module 1165 may provide a lower pixel resolution in other regions of the electronic display 1125, thus lessening power consumption of the AR/VR system 1150 and saving computing resources of the console 1190 without compromising a visual experience of the user. In some embodiments, the processing module 1165 can further use the eye tracking information to adjust where objects are displayed on the electronic display 1125 to prevent vergence-accommodation conflict and/or to offset optical distortions and aberrations.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

The present disclosure is not to be limited in scope by the specific embodiments described herein. Indeed, other various embodiments and modifications, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A three-dimensional (3D) imager for an eye tracking system, the 3D imager comprising:
    an infrared light source for illuminating an eye with a fan of light beams, wherein different light beams of the fan of light beams are at different wavelengths within an infrared wavelength range;
    an array of detector pixels including first and second sub-arrays of detector pixels having first and second overlapping different wavelength dependencies of responsivity, respectively, in the infrared wavelength range;
    an image forming assembly configured to form an image of the eye illuminated with the fan of light beams on the first and second sub-arrays of the array of detector pixels, for use in the eye tracking system for determining at least one of position or orientation of the eye; and
    a wavelength-selective reflector for placing in front of the eye, wherein the wavelength-selective reflector is configured to redirect at least some light beams of the fan of light beams, and to transmit towards the eye outside light in a visible wavelength range.

2. The 3D imager of claim 1, further comprising a controller operably coupled to the array of detector pixels and configured to:
    read out the image of the eye from the first and second sub-arrays of detector pixels; and
    determine a distance to a portion of the eye, wherein an image of the portion of the eye is formed on at least one detector pixel of each one of the first and second sub-arrays of detector pixels, and wherein the distance is determined based on a comparison of signals from the corresponding detector pixels of the first and second sub-arrays of detector pixels.

3. The 3D imager of claim 2, wherein each detector pixel of the array of detector pixels comprises first and second sub-pixels, the first sub-pixels forming the first sub-array and the second sub-pixels forming the second sub-array, wherein the controller is configured to determine the distance based on a comparison of the signals from the first and second sub-pixels.

4. The 3D imager of claim 1, wherein the first and second sub-arrays of detector pixels are provided with first and second spectral filters, respectively, having first and second overlapping different wavelength dependencies of throughput, respectively, for providing the first and second overlapping different wavelength dependencies of responsivity, respectively.

5. The 3D imager of claim 1, wherein the infrared light source comprises a polychromatic light source for emitting polychromatic light, and a dispersive element configured to receive the polychromatic light from the polychromatic light source and angularly disperse the polychromatic light into the fan of the light beams.

6. The 3D imager of claim 1, wherein the responsivity of the first sub-array monotonically decreases with wavelength, and the responsivity of the second sub-array monotonically increases with wavelength within the infrared wavelength range.

7. The 3D imager of claim 1, wherein the array of detector pixels further includes a third sub-array of pixels having a third wavelength dependence of responsivity overlapping with at least the second wavelength dependence of responsivity of the second sub-array.

8. The 3D imager of claim 1, wherein the at least some light beams redirected by the wavelength-selective reflector comprise light beams of the fan of light beams reflected or scattered by the eye towards the wavelength-selective reflector.

9. The 3D imager of claim 1, wherein the wavelength-selective reflector comprises at least one of a hot mirror or a polarization volume hologram (PVH).

10. The 3D imager of claim 9, wherein the PVH is a part of the image forming assembly and has optical power for at least one of collimating or focusing the light beams reflected or scattered by the eye towards the PVH.

11. The 3D imager of claim 9, wherein the PVH is a part of the image forming assembly and is configured for reducing an optical aberration of the image forming assembly.

12. The 3D imager of claim 1, wherein the infrared light source comprises a superluminescent light-emitting diode.

13. A near-eye display comprising:
    a projector for providing image light conveying an image in angular domain;
    a pupil expander coupled to the projector for expanding the image light over an eyebox of the near-eye display; and
    an eye tracker comprising:
    an infrared light source for emitting a fan of light beams towards the eyebox, wherein different light beams of the fan of light beams are at different wavelengths within an infrared wavelength range;
    an array of detector pixels including first and second sub-arrays of detector pixels having first and second overlapping different wavelength dependencies of responsivity, respectively, in the infrared wavelength range; and
    an image forming assembly configured to form an image of an eye illuminated with the fan of light beams on the first and second sub-arrays of the array of detector pixels, for determining at least one of the eye position or orientation by the eye tracker.

14. The near-eye display of claim 13, further comprising a controller operably coupled to the array of detector pixels and configured to:
- read out the image of the eye from the first and second sub-arrays of detector pixels; and
- determine a distance to a portion of the eye, wherein an image of the portion of the eye is formed on at least one detector pixel of each one of the first and second sub-arrays of detector pixels, and wherein the distance is determined based on a comparison of signals from the corresponding detector pixels of the first and second sub-arrays of detector pixels.

15. The near-eye display of claim 13, further comprising a wavelength-selective reflector coupled to the pupil expander and configured to redirect at least some light beams of the fan of light beams reflected or scattered by the eye towards the wavelength-selective reflector.

16. The near-eye display of claim 15, wherein the wavelength-selective reflector comprises at least one of a polarization volume hologram (PVH) or a hot mirror.

17. A method for three-dimensional eye imaging, the method comprising:
- illuminating an eye with a fan of light beams, wherein different light beams of the fan of light beams are at different wavelengths within an infrared wavelength range; and
- forming an image of the eye illuminated with the fan of light beams on an array of detector pixels including first and second sub-arrays of detector pixels having first and second overlapping different wavelength dependencies of responsivity, respectively, in the infrared wavelength range;
- reading out the image of the eye from the array of detector pixels; and
- determining a distance to a portion of the eye, wherein an image of the portion of the eye is formed on at least one detector pixel of each one of the first and second sub-arrays of detector pixels, and wherein the distance is determined based on a comparison of signals from the corresponding detector pixels of the first and second sub-arrays of detector pixels.

18. The method of claim 17, wherein the determining is based on a ratio of the signals from the detector pixels of the first and second sub-arrays of detector pixels.

19. The method of claim 17, further comprising redirecting at least some light beams of the fan of light beams reflected or scattered by the eye towards the array of detector pixels using a wavelength-selective reflector.

* * * * *